United States Patent
Nakashima et al.

(10) Patent No.: US 11,523,014 B2
(45) Date of Patent: Dec. 6, 2022

(54) IMAGE READING APPARATUS INCLIDING AN UPPER UNIT AND A LOWER UNIT DISPOSED VERTICALLY BELOW THE UPPER UNIT, THE UPPER UNIT INCLUDES A FEED TRAY CONFIGURED TO SUPPORT A DOCUMENT FED AT AN INCLINE OF 45 DEGREES OR MORE, A DISCHARGE TRAY SUPPORTS A DOCUMENT DISCHARGED SUCH THAT THE DOCUMENT IS INCLINED AT AN AGLE OF 45 DEGREES OR MORE, THE LOWER UNIT INCLUDES A DOCUMENT POSITIONING PLATE ON WHICH A DOCUMENT IS MOUNTED AND A SECOND READER

(71) Applicant: SEIKO EPSON CORPORATION, Tokyo (JP)

(72) Inventors: Hiroki Nakashima, Fukuoka (JP); Shinsuke Kogi, Matsumoto (JP); Tokujiro Okuno, Kitakyushu (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/450,739

(22) Filed: Oct. 13, 2021

(65) Prior Publication Data
US 2022/0124209 A1  Apr. 21, 2022

(30) Foreign Application Priority Data
Oct. 16, 2020  (JP) .............................. JP2020-174593

(51) Int. Cl.
*H04N 1/00* (2006.01)
*H04N 1/32* (2006.01)
(Continued)

(52) U.S. Cl.
CPC ..... *H04N 1/00596* (2013.01); *H04N 1/00522* (2013.01); *H04N 1/00604* (2013.01);
(Continued)

(58) Field of Classification Search
CPC ........... H04N 1/00522; H04N 1/00596; H04N 1/00604; H04N 1/00814; H04N 1/0464; H04N 1/32138; H04N 1/00525
(Continued)

(56) References Cited

U.S. PATENT DOCUMENTS 5,615,405 A * 3/1997 Yamaguchi ............ G03G 15/00
399/388
2003/0206318 A1  11/2003 Breslawski et al.

FOREIGN PATENT DOCUMENTS

| JP | 05301398 A | * | 4/1992 |
| JP | H0967057 A | * | 9/1995 |
| JP | 2003-333278 A | | 11/2003 |

* cited by examiner

*Primary Examiner* — Chad Dickerson
(74) *Attorney, Agent, or Firm* — Workman Nydegger

(57) ABSTRACT

An upper unit includes a feed tray configured to support a document to be fed such that the document is inclined, a transport path configured to reverse the document fed in a direction having a vertically downward component by a feed tray in a direction having a vertically upward component, a first reader disposed on the transport path, and a discharge tray configured to support the discharged document such that the document is inclined. A lower unit includes a document positioning plate on which a document is mounted, and includes a second reader disposed vertically below the document positioning plate and configured to read the document mounted on the document positioning plate. A portion of the first reader and a portion of the document positioning plate overlap when viewed from vertically above.

14 Claims, 11 Drawing Sheets

(51) Int. Cl.
 *H04N 1/04* (2006.01)
 *H04N 1/23* (2006.01)
(52) U.S. Cl.
 CPC ....... *H04N 1/00814* (2013.01); *H04N 1/0464* (2013.01); *H04N 1/32138* (2013.01)
(58) Field of Classification Search
 USPC ........................................ 358/408, 1.15, 504
 See application file for complete search history.

овеfor# IMAGE READING APPARATUS INCLIDING AN UPPER UNIT AND A LOWER UNIT DISPOSED VERTICALLY BELOW THE UPPER UNIT, THE UPPER UNIT INCLUDES A FEED TRAY CONFIGURED TO SUPPORT A DOCUMENT FED AT AN INCLINE OF 45 DEGREES OR MORE, A DISCHARGE TRAY SUPPORTS A DOCUMENT DISCHARGED SUCH THAT THE DOCUMENT IS INCLINED AT AN AGLE OF 45 DEGREES OR MORE, THE LOWER UNIT INCLUDES A DOCUMENT POSITIONING PLATE ON WHICH A DOCUMENT IS MOUNTED AND A SECOND READER The present application is based on, and claims priority from JP Application Serial Number 2020-174593, filed Oct. 16, 2020, the disclosure of which is hereby incorporated by reference herein in its entirety.

BACKGROUND

1. Technical Field

The present disclosure relates to an image reading apparatus that reads images of documents.

2. Related Art

Image reading apparatuses, such as scanners, are categorized into various types, such as sheet-fed image reading apparatuses and flatbed image reading apparatuses. Sheet-fed image reading apparatuses read images of documents while feeding the documents. Flatbed image reading apparatuses read images of documents mounted on a document positioning glass by using a line sensor that moves with respect to the document positioning glass. In addition, some image reading apparatuses are provided with a combination of a sheet-fed scanner and a flatbed scanner, such as the scanner described in JP-A-2003-333278.

In the scanner described in JP-A-2003-333278, however, the sheet-fed scanner and the flatbed scanner are combined to be horizontally parallel in the vertical direction, resulting in a large scanner.

SUMMARY

According to an aspect of the present disclosure, an image reading apparatus for solving the above-described problem includes an upper unit and a lower unit that is disposed vertically below the upper unit at a given spacing. The upper unit includes a feed tray configured to support a document to be fed such that the document is inclined at an angle of 45° or more with respect to the horizontal, a feed section configured to feed the document supported by the feed tray in a direction having a vertically downward component, a transport path configured to transport the document fed by the feed section and reverse the document in a direction having a vertically upward component, a first reader disposed on the transport path, the first reader being configured to read the document, a discharge section disposed downstream of the first reader on the transport path, the discharge section being configured to discharge the document in a direction having a vertically upward component, and a discharge tray configured to support the document discharged by the discharge section such that the document is inclined at an angle of 45° or more with respect to the horizontal. The lower unit includes a document positioning plate on which a document is mounted and a second reader disposed vertically below the document positioning plate, the second reader being configured to read the document mounted on the document positioning plate. A portion of the first reader and a portion of the document positioning plate overlap when viewed from vertically above.

DESCRIPTION OF EXEMPLARY EMBODIMENTS

Figure 1:
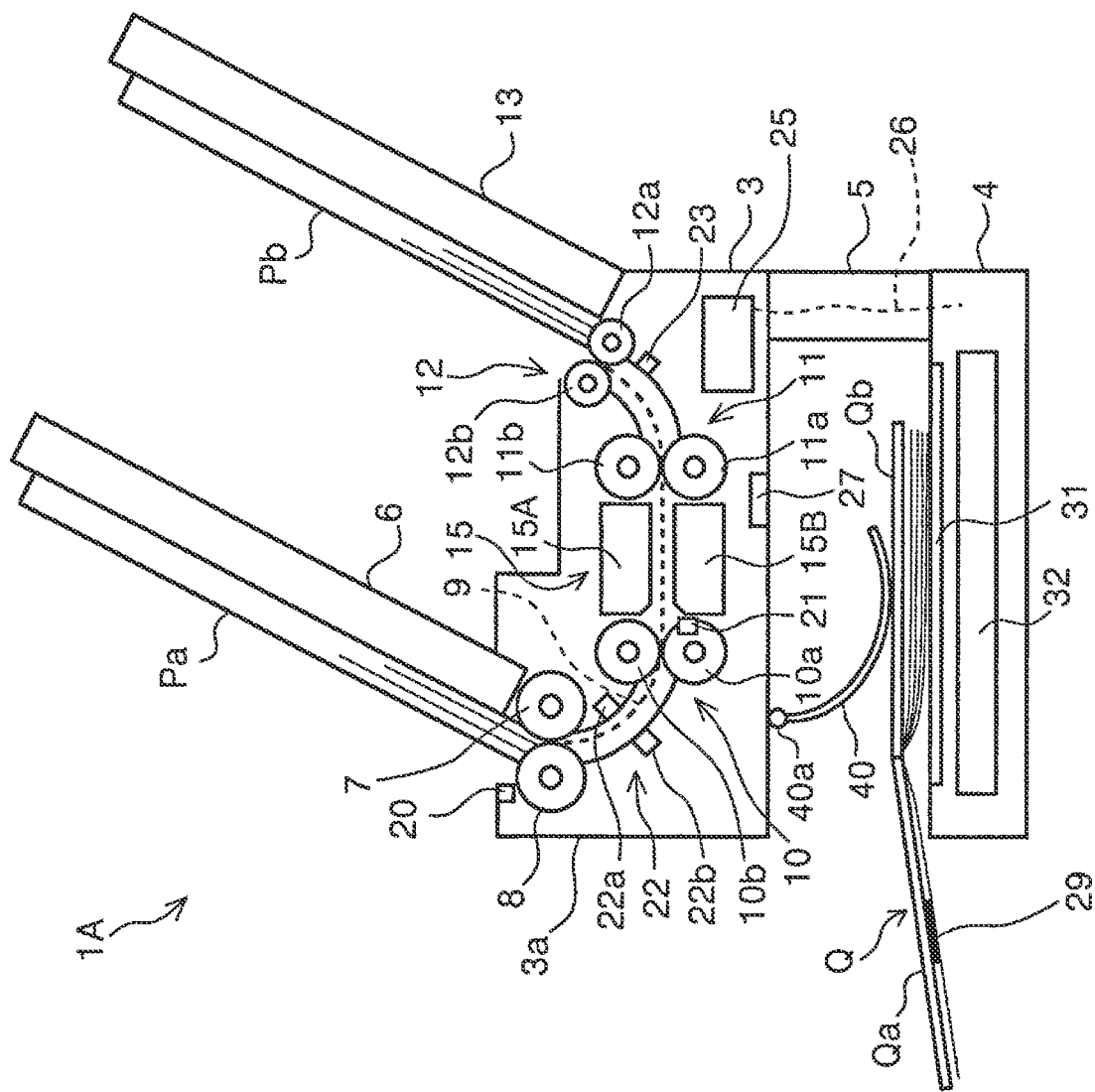
FIG. 1 is a side cross-sectional view schematically illustrating a scanner according to a first embodiment.

Hereinafter, an overview of the present disclosure will be described. An image reading apparatus according to a first aspect includes an upper unit and a lower unit that is disposed vertically below the upper unit at a given spacing. The upper unit includes a feed tray configured to support a document to be fed such that the document is inclined at an angle of 45° or more with respect to the horizontal, a feed section configured to feed the document supported by the feed tray in a direction having a vertically downward component, a transport path configured to transport the document fed by the feed section and reverse the document in a direction having a vertically upward component, a first reader disposed on the transport path, the first reader being configured to read the document, a discharge section disposed downstream of the first reader on the transport path, the discharge section being configured to discharge the document in a direction having a vertically upward component, and a discharge tray configured to support the document discharged by the discharge section such that the document is inclined at an angle of 45° or more with respect to the horizontal. The lower unit includes a document positioning plate on which a document is mounted and a second reader disposed vertically below the document positioning plate, the second reader being configured to read the document mounted on the document positioning plate. A portion of the first reader and a portion of the document positioning plate overlap when viewed from vertically above.

According to the aspect, an image reading apparatus includes an upper unit, which is a sheet-fed type, and a lower unit, which is a flatbed type, and a portion of a first reader in the upper unit and a portion of a document positioning plate in the lower unit overlap when viewed from vertically above. With this structure, the overall size of the apparatus can be reduced in the horizontal direction compared with a structure in which the upper unit and the lower unit are combined to be horizontally parallel in the vertical direction. In addition, the feed tray and the discharge tray of the upper unit support documents respectively such that the documents are inclined at an angle of 45° or more with respect to the horizontal. This structure reduces the space occupied by the feed tray and the discharge tray in the horizontal direction, reducing the size of the upper unit and the overall size of the image reading apparatus in the horizontal direction.

According to a second aspect, the feed tray and the discharge tray of the first aspect may be disposed at a given spacing in an apparatus depth direction, and the first reader may be disposed within the bounds of the document positioning plate in the apparatus depth direction. According to the second aspect, the feed tray and the discharge tray are disposed at a given spacing in an apparatus depth direction, and the first reader is disposed within the bounds of the document positioning plate in the apparatus depth direction, thereby reducing the size of the apparatus in the apparatus depth direction. In this specification, a direction from the apparatus front toward the apparatus rear and the opposite direction from the apparatus rear toward the apparatus front are collectively referred to as the "apparatus depth direction". Here, the front of the image reading apparatus is a side facing the user of the apparatus among the sides of the apparatus. The side facing the user among the sides of the apparatus is defined, for example, by placement of a power button of the apparatus and operation buttons used to perform a variety of operations, a direction in which characters indicating functions of operation buttons are displayed, placement of a display section for displaying various types of information when such a display section is provided, or a direction in which characters, graphics, or the like are displayed on the display section.

According to a third aspect, at least one of the feed tray and the discharge tray of the first or the second aspect may be disposed within the bounds of the upper unit when viewed from vertically above. According to the third aspect, at least one of the feed tray and the discharge tray is disposed within the bounds of the upper unit when viewed from vertically above. Accordingly, at least one of the feed tray and the discharge tray does not protrude from the upper unit in the horizontal direction, reducing the size of the upper unit and the overall size of the image reading apparatus in the horizontal direction.

According to a fourth aspect, the document positioning plate of any one of the first to third aspects may be disposed within the bounds of the first reader in a direction in which the first reader extends. According to the fourth aspect, the document positioning plate is disposed within the bounds of the first reader in a direction in which the first reader extends. Accordingly, the document positioning plate does not protrude from the first reader in the extending direction, reducing the size of the document positioning plate, that is, the lower unit.

According to a fifth aspect, the image reading apparatus of any one of the first to fourth aspects may include a support section disposed on the rear of the apparatus in the apparatus depth direction such that the lower unit supports the upper unit. The support section defines an opening between the upper unit and the lower unit on the front of the apparatus in the apparatus depth direction. The second reader may read the document while the second reader is being moved in the apparatus depth direction. A white reference section configured to be read by the second reader may be disposed behind the document positioning plate in the apparatus depth direction.

The white reference section is used for tonal correction, and in the fifth aspect, the white reference section is disposed behind the document positioning plate in the apparatus depth direction, that is, on the side opposite to the front of the apparatus that is open in the apparatus depth direction. Accordingly, when the second reader reads the white reference section, an appropriate white reference value can be obtained while suppressing effects of ambient light.

According to a sixth aspect, the upper unit of any one of the first to fifth aspects may include a first motor that is a drive source for applying a feeding force to a document, and the first motor may be disposed at one end in an apparatus width direction intersecting the document depth direction. The second reader may read the document while the second reader is being moved in the apparatus width direction. The lower unit may include a second motor that is a drive source for moving the second reader in the apparatus width direction, and the second motor may be disposed at the end opposite to the end at which the first motor is disposed in the apparatus width direction.

According to the sixth aspect, the first motor is disposed at one end in the apparatus width direction and the second motor is disposed at the other end in the apparatus width direction, enabling the first motor and the second motor, which are heavy, to be well balanced in weight in the apparatus width direction compared with a structure in which the weight distribution of the first motor and the second motor is unbalanced to one side in the apparatus width direction. Accordingly, the user is able to readily carry the apparatus.

According to a seventh aspect, the lower unit of any one of the first to sixth aspects may include a slide section configured to be slid with respect to a unit body in a horizontal direction, and the slide section may include the document positioning plate and the second reader.

According to the seventh aspect, the lower unit includes a slide section configured to be slid with respect to a unit body in a horizontal direction, and the slide section includes the document positioning plate and the second reader, thereby increasing operability without interfering with the upper unit when the user mounts a document on the document positioning plate.

According to an eighth aspect, a position of the upper unit of any one of the first to seventh aspects may be changed with respect to the lower unit in the vertical direction. According to the eighth aspect, the upper unit is configured to be moved with respect to the lower unit in the vertical direction. Accordingly, when the apparatus is not used, the distance between the upper unit and the lower unit is shortened, saving the space occupied by the apparatus in the vertical direction.

According to a ninth aspect, the image reading apparatus of any one of the first to eighth aspects may include a mount detector configured to detect whether a document is mounted on the document positioning plate. In the image reading apparatus, a controller that controls the second reader detects a document mounted on the document positioning plate in accordance with a detection signal from the mount detector and reads the document mounted on the document positioning plate by using the second reader.

According to the ninth aspect, the controller detects a document mounted on the document positioning plate in accordance with a detection signal from the mount detector and reads the document mounted on the document positioning plate by using the second reader, thereby enhancing usability of the apparatus.

According to a tenth aspect, the image reading apparatus of any one of the first to eighth aspects may include a controller configured to control the upper unit and the lower unit. The controller may be configured to simultaneously cause the upper unit to perform a document reading operation and the lower unit to perform a document reading operation. According to the tenth aspect, the controller is configured to simultaneously cause the upper unit to perform a document reading operation and the lower unit to perform a document reading operation, thereby enhancing the usability of the apparatus.

According to an eleventh aspect, the image reading apparatus of any one of the first to tenth aspects may include a wireless communication section that reads, via wireless communication, information from an IC tag attached to the document mounted on the document positioning plate. According to the eleventh aspect, the image reading apparatus includes a wireless communication section that reads, via wireless communication, information from an IC tag attached to the document mounted on the document positioning plate, thereby extending the utility of the apparatus and enhancing user convenience.

According to a twelfth aspect, the image reading apparatus of any one of the first to eleventh aspects may include a document pressing section that presses the document mounted on the document positioning plate against the document positioning plate. According to the twelfth aspect, the image reading apparatus includes a document pressing section that presses the document mounted on the document positioning plate against the document positioning plate. The document pressing section holds loose documents on the document positioning plate, providing good reading results.

Hereinafter, embodiments of the present disclosure will be described. In the following description, as an example image reading apparatus, a scanner that includes a combination of a sheet-fed scanner and a flatbed scanner will be described. A scanner 1A illustrated in FIG. 1 to FIG. 3 includes a combination of an upper unit 3, which is a sheet-fed scanner, and a lower unit 4, which is a flatbed scanner.

The X-Y-Z coordinate system in the drawings is an orthogonal coordinate system in which the X-axis direction and the Y-axis direction denote horizontal directions and the Z-axis direction denotes a vertical direction. The X-axis direction also denotes an apparatus width direction, and the Y-axis direction also denotes an apparatus depth direction. In all of the embodiments described below, the positive Y direction denotes a direction from an apparatus rear toward an apparatus front, and the negative Y direction denotes a direction from the apparatus front toward the apparatus rear. Accordingly, the apparatus front is a side in the positive Y direction. In all of the embodiments described below, the X-axis direction denotes a direction intersecting a document transport direction in the upper unit 3, that is, a document width direction, and also denotes an extending direction in which a reader 15, which will be described below, extends. The positive X direction denotes a left direction and the negative X direction denotes a right direction when viewed by the user facing the apparatus front. In the upper unit 3, a direction in which a document is transported may be referred to as "downstream" and the opposite direction may be referred to as "upstream".

Figure 2:
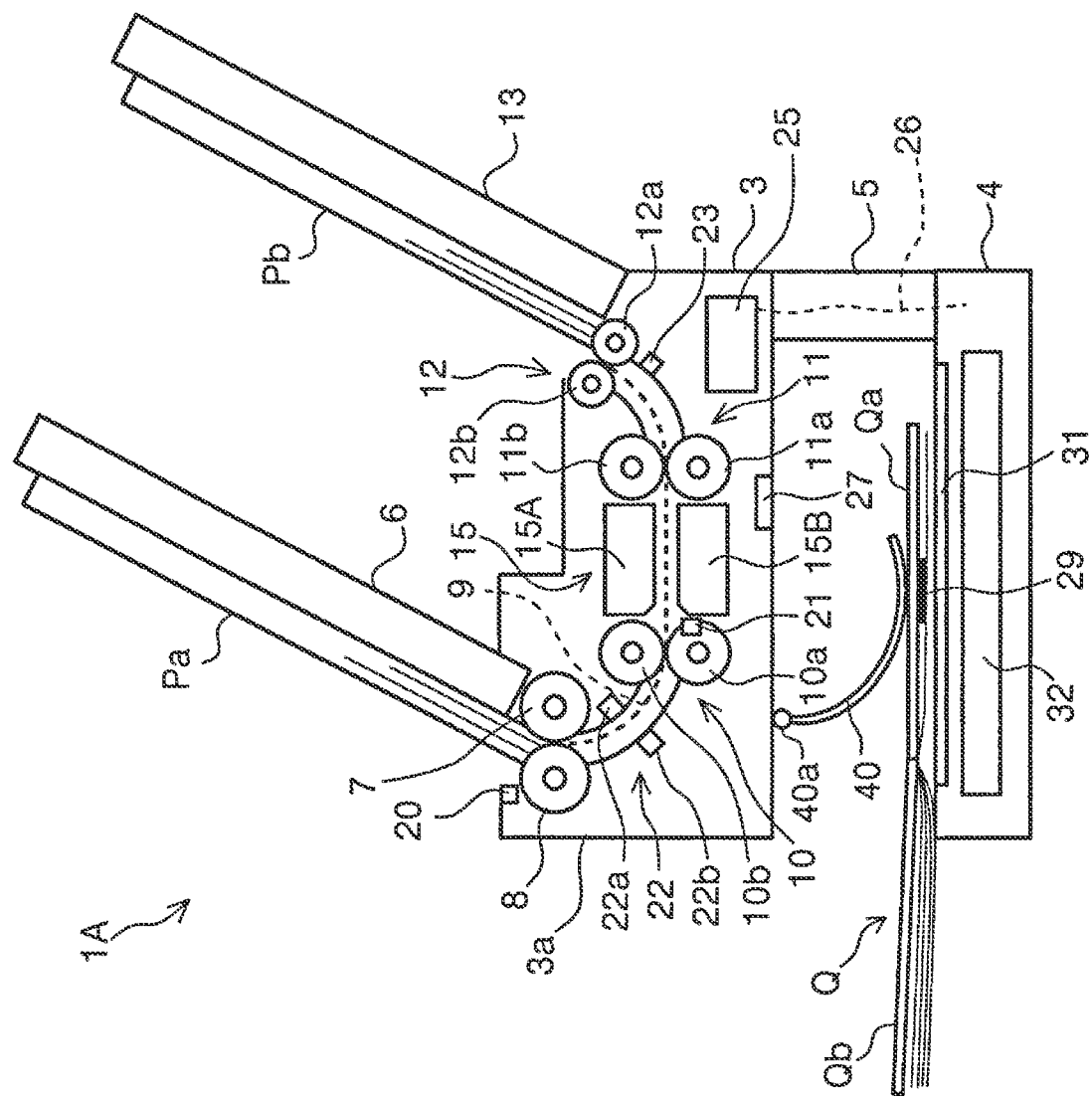
FIG. 2 is a side cross-sectional view schematically illustrating the scanner according to the first embodiment.
Figure 4:
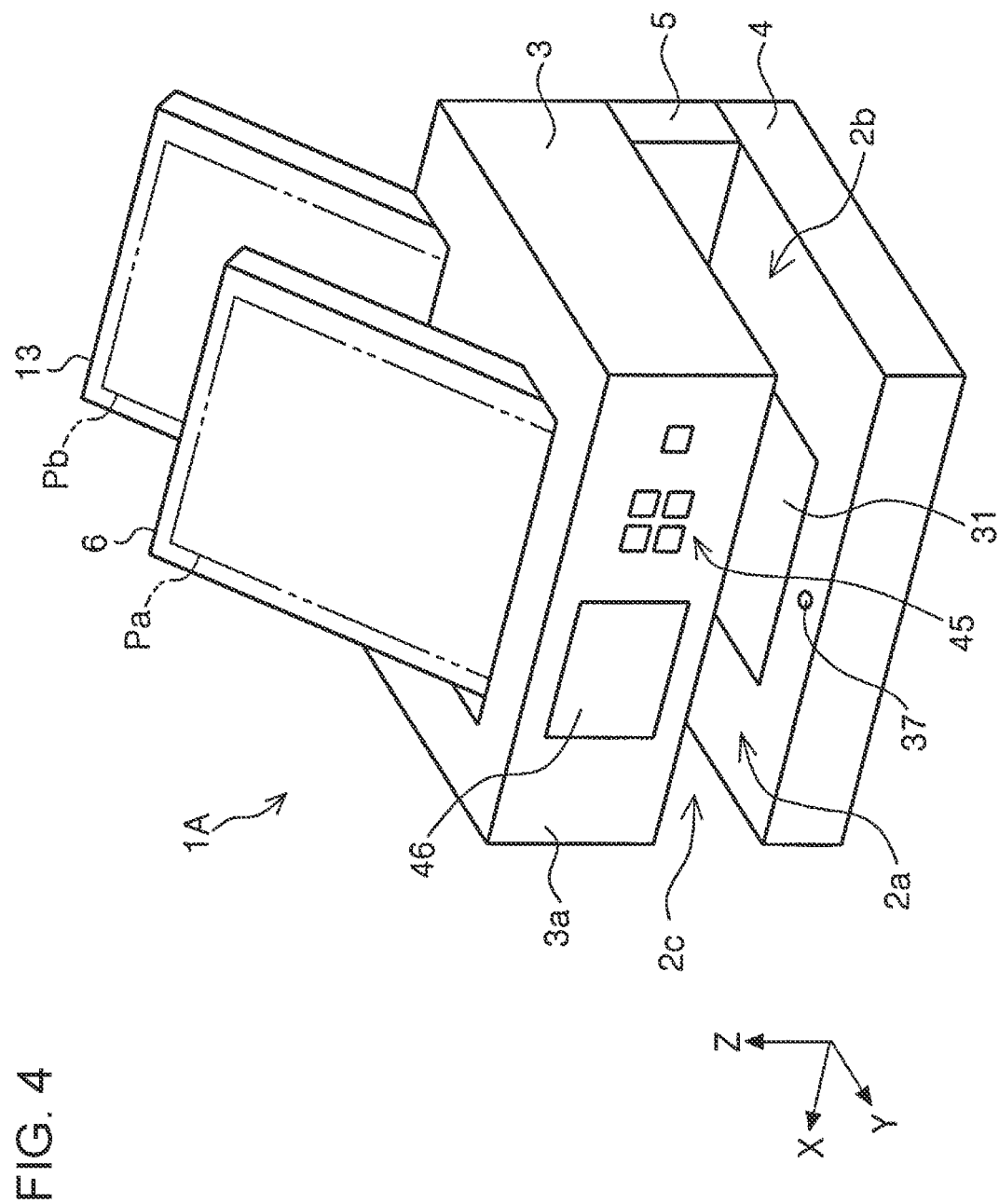
FIG. 4 is an external perspective view schematically illustrating the scanner according to the first embodiment.

In FIG. 1 and FIG. 2, the lower unit 4 is disposed vertically below the upper unit 3 at a given spacing. The upper unit 3 is supported by a support section 5. The support section 5 is disposed on the rear of the apparatus, thereby defining a front opening 2a (see FIG. 4) that is open between the upper unit 3 and the lower unit 4 in the positive Y direction on the front of the apparatus. A document can be set on the lower unit 4 through the front opening 2a. FIG. 1 and FIG. 2 illustrate a booklet Q that is an example document set on the lower unit 4. The space between the lower unit 4 and the upper unit 3 is open also in the positive X direction and in the negative X direction as illustrated in FIG. 4. FIG. 4 illustrates a left opening 2c and a right opening 2b. With this structure, the user can set documents on the lower unit 4 also from the left opening 2c or the right opening 2b. It should be noted that between the lower unit 4 and the upper unit 3, the side in the positive X direction and the side in the negative X direction may be closed, that is, the left opening 2c and the right opening 2b may be omitted.

A structure of the upper unit 3 will be described first in the following description. The upper unit 3 includes a feed tray 6 that supports documents to be fed. The feed tray 6 supports documents Pa such that the documents Pa to be fed are inclined at an angle of 45° or more with respect to the horizontal. In this embodiment, for example, the feed tray 6 supports the documents Pa to be fed such that the documents Pa are inclined at an angle of 60°.

A feed roller 7 and a separation roller 8 are disposed below the feed tray 6. The feed roller 7 is driven by a motor (not illustrated). The separation roller 8 nips and separates, with the feed roller 7, a document therebetween while the separation roller 8 receives rotational resistance. The feed roller 7 is an example feed section that feeds a document Pa, which is supported by the feed tray 6, in a direction having a vertically downward component. The feed roller 7 according to the embodiment feeds the document Pa in a substantially vertically downward direction. The feed roller 7 according to the embodiment comes into contact with the lowermost document Pa of the documents Pa supported by the feed tray 6 and feeds the document Pa downstream. It should be noted that the feed roller 7 may come into contact with the uppermost document Pa of the documents Pa supported by the feed tray 6 and feed the document Pa downstream.

A transport path 9 is provided downstream of the feed roller 7. The transport path 9 is a path that transports a document fed by the feed roller 7 and reverses the document in a direction having a vertically upward component. The feed roller 7 is disposed at the start of the transport path 9, and a discharge roller pair 12, which will be described below, is disposed at the end of the transport path 9.

A first transport roller pair 10, the reader 15, and a second transport roller pair 11 are disposed on the transport path 9. The first transport roller pair 10 includes a driving roller 10a that is driven by a motor (not illustrated) and a driven roller 10b that nips, with the driving roller 10a, a document therebetween and is rotated. The first transport roller pair 10 transports the document toward the reader 15.

The reader 15 is an example first reader and includes a lower sensor unit 15B, which is disposed below the transport path 9, and an upper sensor unit 15A, which is disposed above the transport path 9. Each of the lower sensor unit 15B and the upper sensor unit 15A according to the embodiment is a contact image sensor module. Each of the upper sensor unit 15A and the lower sensor unit 15B extends widthwise in the X-axis direction to cover the entirety of the document in the width direction. A maximum document width of a standard size paper that can be read by the reader 15 is up to, for example, the shorter side of A4 paper as defined by the international ISO 216 standard.

The second transport roller pair 11 is disposed downstream of the reader 15. The second transport roller pair 11 includes a driving roller 11*a* that is driven by a motor (not illustrated) and a driven roller 11*b* that nips, with the driving roller 11*a*, a document therebetween and is rotated. The second transport roller pair 11 transports the document toward the discharge roller pair 12.

The discharge roller pair 12 includes a driving roller 12*a* that is driven by a motor (not illustrated) and a driven roller 12*b* that nips, with the driving roller 12*a*, a document therebetween and is rotated. The discharge roller pair 12 is an example discharge section that discharges a document in a direction having a vertically upward component. The discharge roller pair 12 according to the embodiment discharges a document in the upper-right direction in FIG. 1, that is, in an obliquely upward direction having a positive Z direction component and a negative Y direction component.

The document discharged by the discharge roller pair 12 from the transport path 9 is supported by a discharge tray 13. The discharge tray 13 supports a document Pb such that the discharged document Pb is inclined at an angle of 45° or more with respect to the horizontal. In this embodiment, for example, the discharge tray 13 supports the document Pb such that the document Pb is inclined at an angle of 60°.

A controller 25 is provided in the upper unit 3. The controller 25 controls feeding, transporting, reading, and discharging of a document in the upper unit 3. The controller 25 is coupled via a cable 26 to components to be controlled in the lower unit 4 and controls reading of a document in the lower unit 4. The cable 26 extends inside the support section 5 as illustrated in FIG. 1 and FIG. 2; however, the cable 26 may be provided on the apparatus rear, which is outside the support section 5. As illustrated in FIG. 4, an operation section 45 and a display section 46 are provided on a side 3*a* of the upper unit 3 in the positive Y direction. The operation section 45 is used to perform a variety of operations on the scanner 1A. The display section 46 displays various types of information. The operation section 45 includes a power button and various setting buttons and transmits operation information to the controller 25. The controller 25 causes the display section 46 to display various types of information. Accordingly, the side 3*a* is a side facing the user, that is, the front of the scanner 1A.

Returning to FIG. 1 and FIG. 2, the upper unit 3 includes a plurality of detectors. A set detector 20 is disposed at a position facing a lower end portion of the feed tray 6. The controller 25 receives a detection signal from the set detector 20, thereby detecting whether a document is mounted on the feed tray 6. The set detector 20 according to the embodiment is a non-contact optical sensor but may be a contact sensor.

A multi-sheet feed detector 22 is disposed downstream of the feeding roller 7. The multi-sheet feed detector 22 is an ultrasonic sensor that includes an ultrasonic transmitter 22*a* and an ultrasonic receiver 22*b* disposed across the transport path 9 from each other. The controller 25 detects multi-sheet feeding of documents by receiving a detection signal from the multi-sheet feed detector 22. A first document detector 21 is disposed between the first transport roller pair 10 and the reader 15. The controller 25 receives a detection signal from the first document detector 21, thereby detecting passage of a leading edge or a trailing edge of a document at the position of the first document detector 21.

A second document detector 23 is disposed upstream and in the vicinity of the discharge roller pair 12. The controller 25 receives a detection signal from the second document detector 23, thereby detecting passage of a leading edge or a trailing edge of a document at the position of the second document detector 23. The first document detector 21 and the second document detector 23 according to the embodiment are non-contact optical sensors but may be contact sensors.

Next, the lower unit 4 will be described. The lower unit 4 includes a document positioning glass 31 on which a document is mounted and includes a read sensor 32 that serves as a second reader that reads a document mounted on the document positioning glass 31. The read sensor 32 according to the embodiment is a contact image sensor module extending in the Y-axis direction and is moved in the X-axis direction. The read sensor 32 may be a charge coupled device (CCD) sensor instead of the contact image sensor module. In addition, instead of the moving line sensor, a fixed area sensor may be used for reading. A maximum document width of a standard size paper that can be mounted on the document positioning glass 31 for reading may be up to, for example, B7 paper as defined by the international standard ISO 216. The lower unit 4 is thus suitable for reading passports.

FIG. 1 and FIG. 2 illustrate a booklet Q that is an example document, such as a passport. Reference Qa denotes a front cover and reference Qb denotes a back cover. In reading pages of the booklet Q, first, the booklet Q is opened as illustrated in FIG. 1 and FIG. 2, then, a page on the back cover Qb side is read as illustrated in FIG. 1, the booklet Q is rotated on the horizontal surface, and a page on the front cover Qa side is read as illustrated in FIG. 2.

Figure 3:
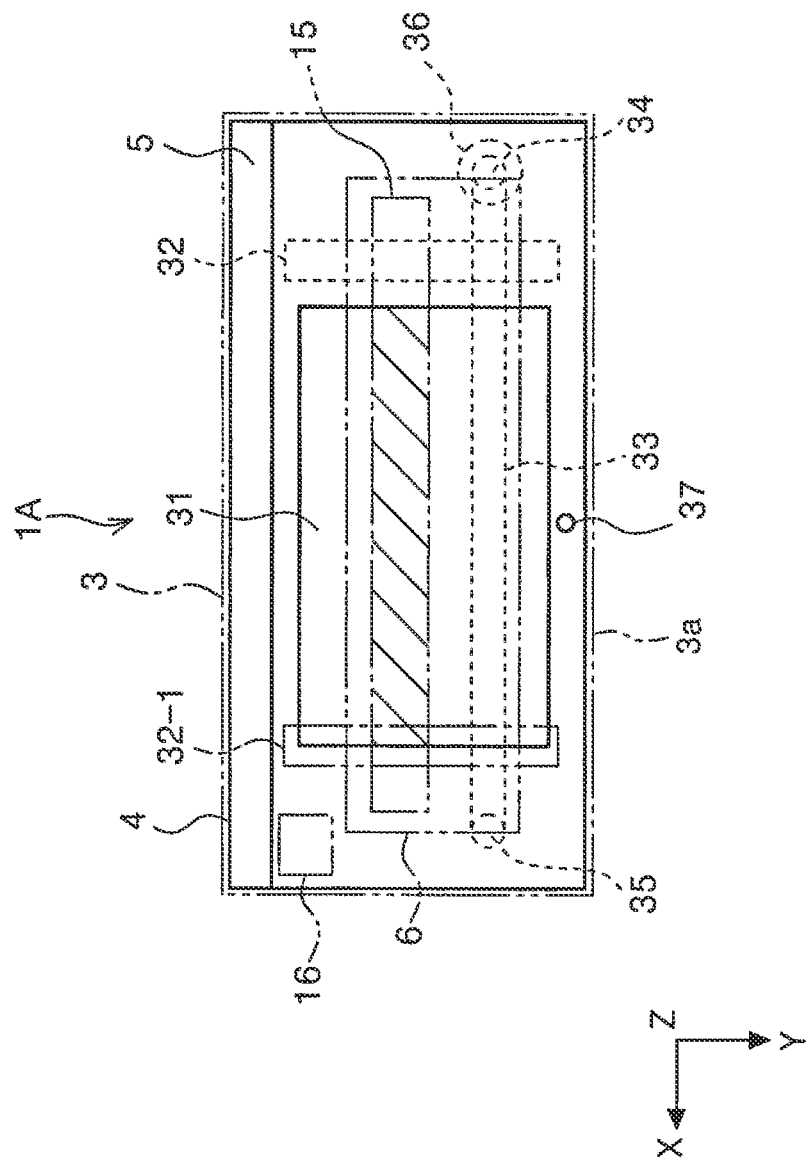
FIG. 3 is a plan view illustrating a lower unit of the scanner according to the first embodiment.

The lower unit 4 includes a second motor 36 that is disposed near an end in the negative X direction as illustrated in FIG. 3. A drive pulley 34 is disposed around a drive shaft of the second motor 36. A driven pulley 35 is disposed near an end in the positive X direction. A drive belt 33 is looped over the drive pulley 34 and the driven pulley 35. The read sensor 32 is fixed to the drive belt 33, and the read sensor 32 is moved in the X-axis direction by the second motor 36. A read sensor 32 indicated by the broken line is located at a home position. A sensor 32-1 indicated by the chain double-dashed line is located at an end in a direction opposite to the home position.

A document pressing section 40 that presses a document mounted on the document positioning glass 31 against the document positioning glass 31 is disposed on the bottom of the upper unit 3, that is, on a surface of the upper unit 3 that faces the lower unit 4 as illustrated in FIG. 1 and FIG. 2. The document pressing section 40 can be rotated about a rotation shaft 40*a* and is pressed toward the document positioning glass 31 by a spring (not illustrated). The document pressing section 40 holds loose documents on the document positioning glass 31, providing good reading results. It should be noted that the portion of the document pressing section 40 coming into contact with a document may comprise a roller that is rotated. In such a case, the load generated when a document is inserted between the document pressing section 40 and the document positioning glass 31 can be reduced.

In the above description, the overall structure of the scanner 1A has been described, and hereinafter, other features of the scanner 1A will be described. In FIG. 3, the reader 15 of the upper unit 3 is indicated by the chain double-dashed line, and a portion of the reader 15 of the upper unit 3 overlaps a portion of the document positioning glass 31 of the lower unit 4 when viewed from vertically above. The overlapping portions of the reader 15 and the document positioning glass 31 are indicated by a hatch pattern in FIG. 3. With this structure, the overall size of the apparatus can be reduced in the horizontal direction compared with a structure in which the upper unit 3 and the lower unit 4 are combined to be horizontally parallel in the vertical direction. In addition, the feed tray 6 and the discharge tray 13 of the upper unit 3 support documents respectively such that the documents are inclined at an angle of 45° or more with respect to the horizontal. This structure reduces the space occupied by the feed tray 6 and the discharge tray 13 in the horizontal direction, reducing the size of the upper unit 3 and the overall size of the image reading apparatus in the horizontal direction.

In this embodiment, the outline of the upper unit 3 is the same size as the outline of the lower unit 4 when viewed from vertically above. In FIG. 3, although the outline of the upper unit 3 is slightly larger than the outline of the lower unit 4 for convenience of illustration, they are actually the same size. Similarly, in FIG. 5 and the following drawings, the outline of the upper unit 3 and the outline of the lower unit 4, which have the same size, are illustrated such that the outline of the upper unit 3 is slightly outwardly larger.

The feed tray 6 and the discharge tray 13 are disposed at a given space in the Y-axis direction and the reader 15 is within the bounds of the document positioning glass 31 in the Y-axis direction. This structure reduces the size of the apparatus in the Y-axis direction, that is, in the apparatus depth direction.

In FIG. 3, the occupied area of the feed tray 6 of the upper unit 3 is indicated by the chain double-dashed line. The feed tray 6 is disposed within the bounds of the upper unit 3 when viewed from vertically above as in FIG. 3. With this structure, the feed tray 6 does not protrude from the upper unit 3 in the horizontal direction, reducing the size of the upper unit 3 and the overall size of the scanner 1A in the horizontal direction. It should be noted that the document transport direction in the transport path 9 may be a direction from the apparatus rear toward the apparatus front, which is opposite to the direction according to the above-described embodiment. In such a case, the above-described discharge tray 13 functions as a feed tray and the feed tray 6 functions as a discharge tray, and the discharge tray is disposed within the bounds of the upper unit 3 when viewed from vertically above. In addition, both of the feed tray 6 and the discharge tray 13 may be disposed within the bounds of the upper unit 3 when viewed from vertically above.

The document positioning glass 31 is disposed within the bounds of the reader 15 in the X-axis direction, that is, in a direction the reader 15 extends as illustrated in FIG. 3. With this structure, the document positioning glass 31 does not protrude from the reader 15 in the X-axis direction, reducing the size of the document positioning glass 31, that is, the lower unit 4.

In FIG. 3, a first motor 16, which is a drive source for applying a feeding force to a document, is indicated by the chain double-dashed line in the upper unit 3. The first motor 16 is a drive source for the feeding roller 7, the first transport roller pair 10, the second transport roller pair 11, and the discharge roller pair 12. The first motor 16 is disposed at one end in the upper unit 3 in the positive X direction, that is, in the apparatus width direction. The second motor 36 of the lower unit 4 is disposed at an end in the negative X direction, that is, at the end opposite to the end at which the first motor 16 is disposed. This structure enables the first motor 16 and the second motor 36, which are heavy, to be well balanced in weight in the apparatus width direction compared with a structure in which the weight distribution of the first motor 16 and the second motor 36 is unbalanced to one side in the apparatus width direction. Accordingly, the user is able to readily carry the apparatus.

FIG. 3 illustrates a mount detector 37 that detects whether a document is mounted on the document positioning glass 31. The mount detector 37 is, for example, an optical sensor. When the booklet Q is mounted on the document positioning glass 31, the mount detector 37 is covered by the booklet Q as illustrated in FIG. 1 and FIG. 2. The controller 25 detects whether a document is mounted on the document positioning glass 31 in accordance with a detection signal from the mount detector 37. After the controller 25, which controls the read sensor 32, detects a document mounted on the document positioning glass 31 in accordance with a detection signal from the mount detector 37, the controller 25 reads the document mounted on the document positioning glass 31 by using the read sensor 32. This operation eliminates a user operation of starting a reading operation each time the user mounts the booklet Q on the document positioning glass 31, thereby enhancing the usability of the apparatus.

In addition, the controller 25 can simultaneously perform a document reading operation in the upper unit 3 and a document reading operation in the lower unit 4, thereby enhancing the usability of the apparatus.

FIG. 1 and FIG. 2 illustrate a wireless communication section 27 that is disposed on the bottom of the upper unit 3, that is, on a surface of the upper unit 3 that faces the lower unit 4. The wireless communication section 27 is a wireless communication section that reads information via wireless communication from an IC tag 29 attached to a document mounted on the document positioning glass 31. The wireless communication section 27 extends the utility of the apparatus and enhancing user convenience. The wireless communication section 27 may be disposed on the lower unit 4 or on the support section 5.

Figure 5:
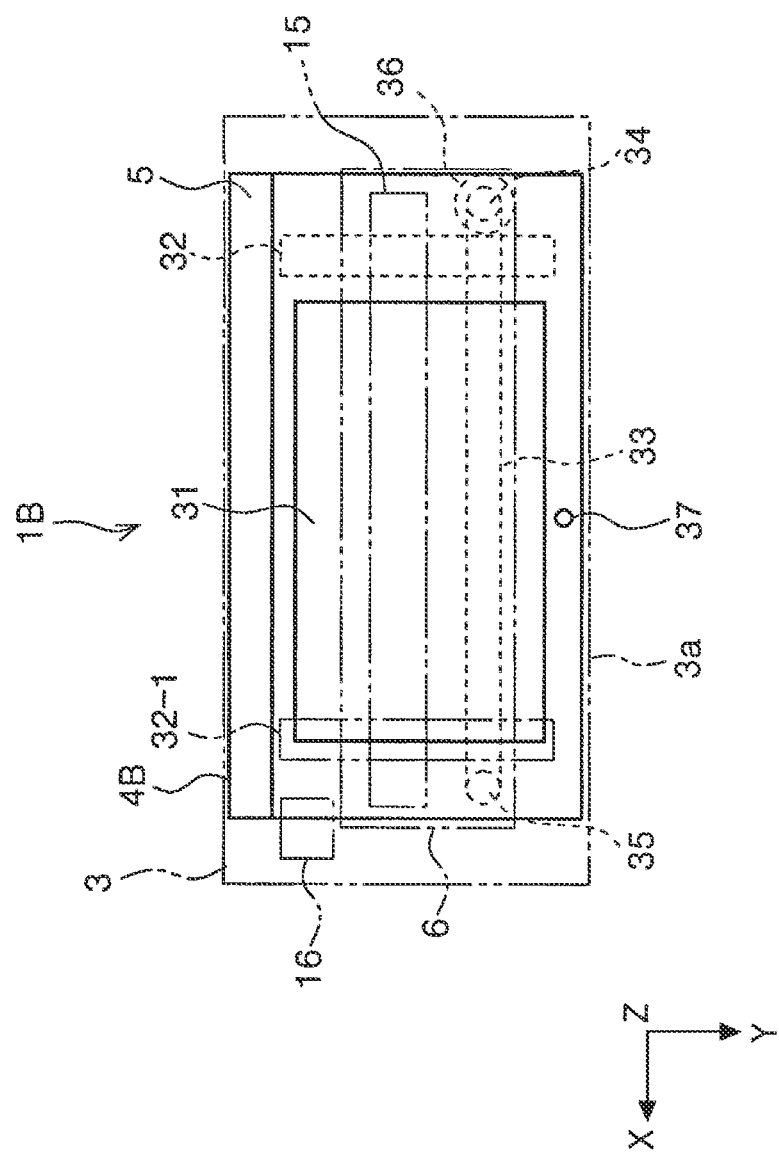
FIG. 5 is a plan view illustrating a lower unit of a scanner according to a second embodiment.

Hereinafter, modifications of the scanner 1A will be described with reference to FIG. 5 and subsequent drawings. In the following embodiments, components similar to those in the above-described first embodiment are given the same reference numerals, and descriptions of the components are omitted in the following descriptions. A scanner 1B illustrated in FIG. 5 includes the upper unit 3 and a lower unit 4B. A width of the lower unit 4B in the X-axis direction is shorter than the width of the upper unit 3. This structure enables the lower unit 4B to have a minimum width in the X-axis direction, thereby providing the lightweight apparatus.

Figure 6:
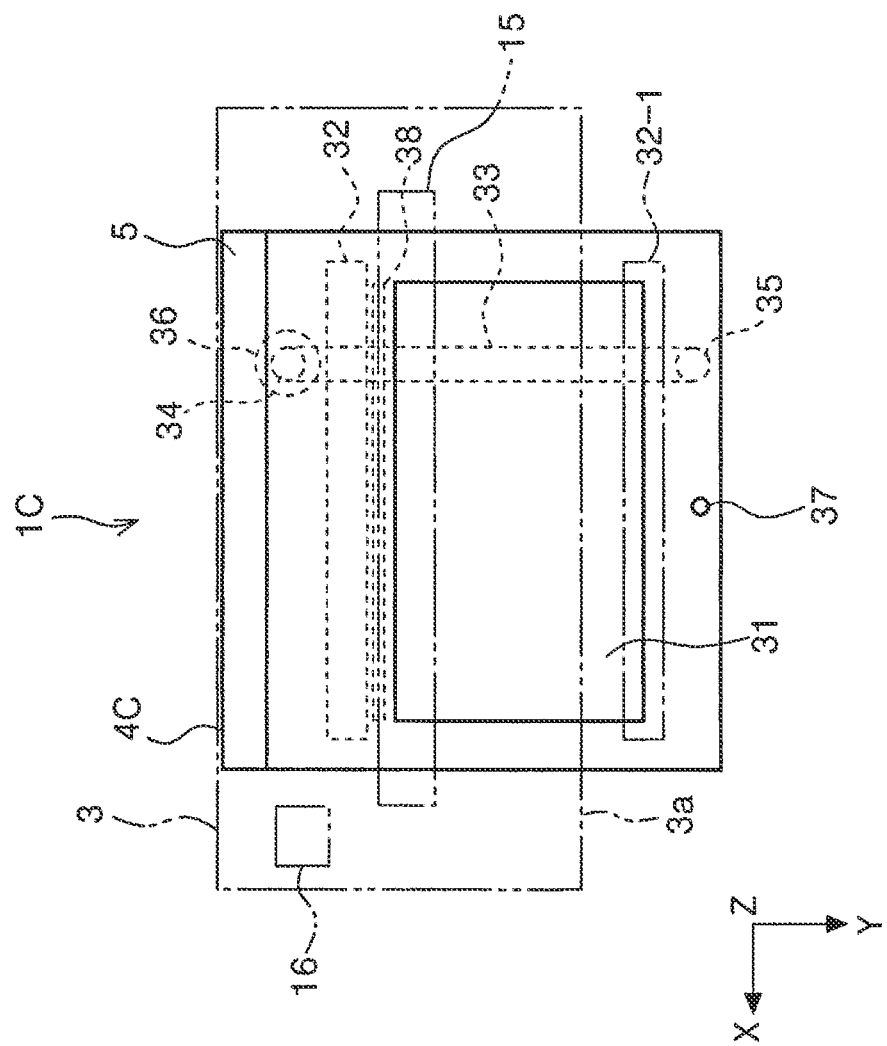
FIG. 6 is a plan view illustrating a lower unit of a scanner according to a third embodiment.

A scanner 1C illustrated in FIG. 6 includes the upper unit 3 and a lower unit 4C. A width of the lower unit 4C in the X-axis direction is shorter than the width of the upper unit 3. This structure enables the lower unit 4C to have a minimum width in the X-axis direction, thereby providing the lightweight apparatus. It should be noted that the width of the lower unit 4C in the X-axis direction may be the same as the width of the upper unit 3. The read sensor 32 in the lower unit 4C according to the embodiment reads a document while the read sensor 32 is being moved in the Y-axis direction, that is, in the apparatus depth direction. A white reference section 38 that is read by the read sensor 32 is disposed behind the document positioning glass 31 in the negative Y direction, that is, in the apparatus depth direction. The white reference section 38 is used in tonal correction and is read by the read sensor 32 as necessary. In this structure, the white reference section 38 is disposed behind the document positioning glass 31 in the apparatus depth direction, that is, on the side opposite to the front of the apparatus that is open in the apparatus depth direction. Accordingly, when the read sensor 32 reads the white reference section 38, an appropriate white reference value can be obtained while suppressing effects of ambient light.

Figure 7:
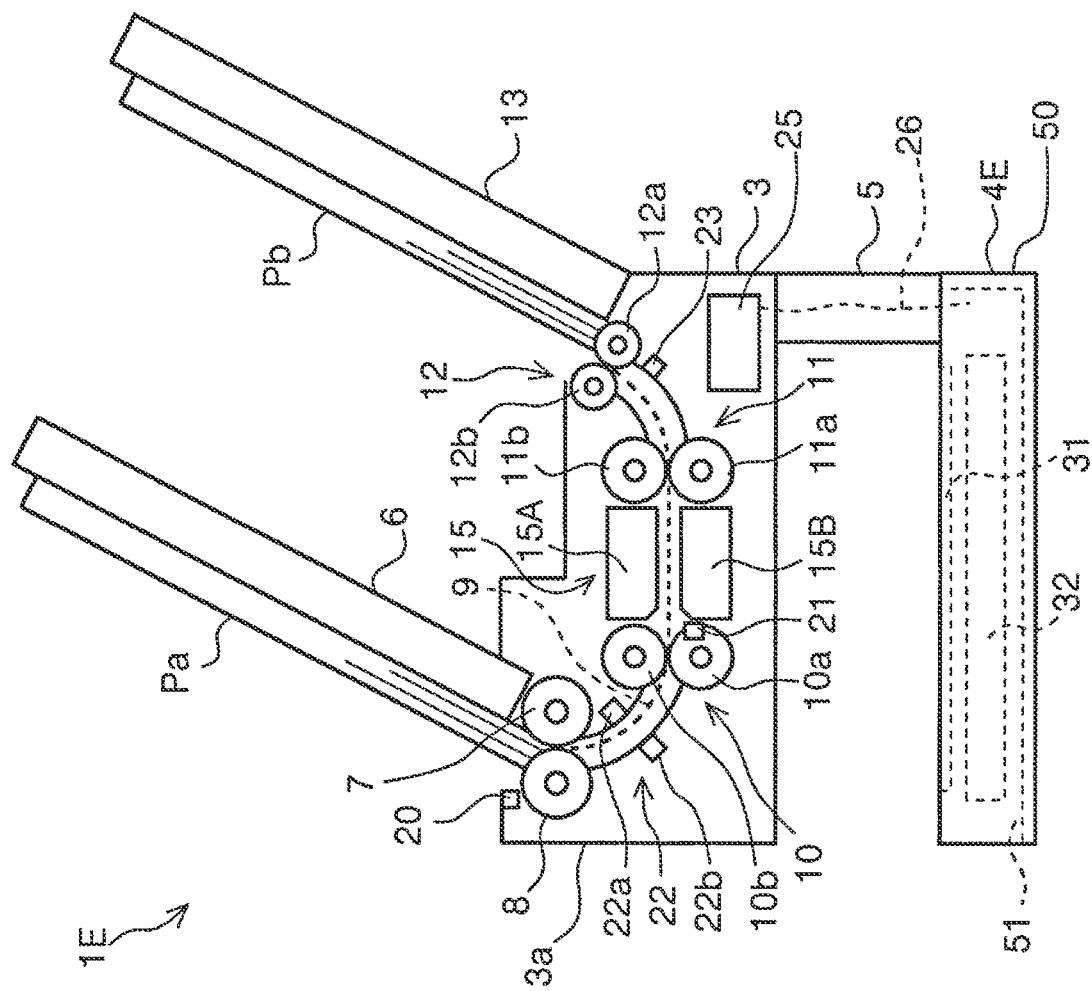
FIG. 7 is a side cross-sectional view schematically illustrating a scanner according to a fourth embodiment.
Figure 8:
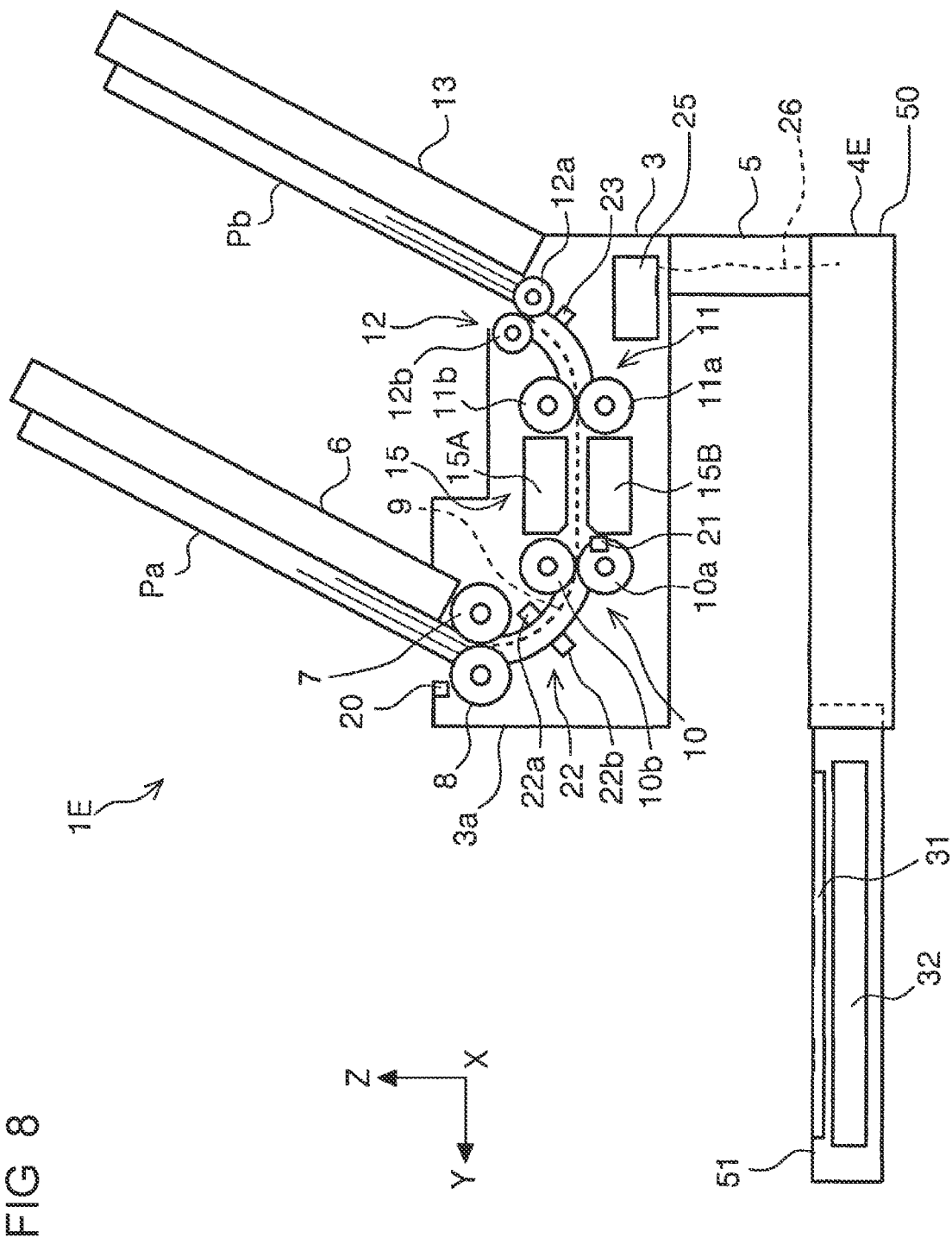
FIG. 8 is a side cross-sectional view schematically illustrating the scanner according to the fourth embodiment.

A scanner 1E illustrated in FIG. 7 and FIG. 8 includes the upper unit 3 and a lower unit 4E. The lower unit 4E includes a slide section 51 that is slid from the unit body 50 in the Y-axis direction. The slide section 51 includes the document positioning glass 31 and the read sensor 32. In this structure, the slide section 51 is pulled in the positive Y direction to broadly expose the top of the document positioning glass 31 as illustrated in the change from FIG. 7 to FIG. 8, thereby increasing operability without interfering with the upper unit 3 when the user mounts a document on the document positioning glass 31.

Figure 9:
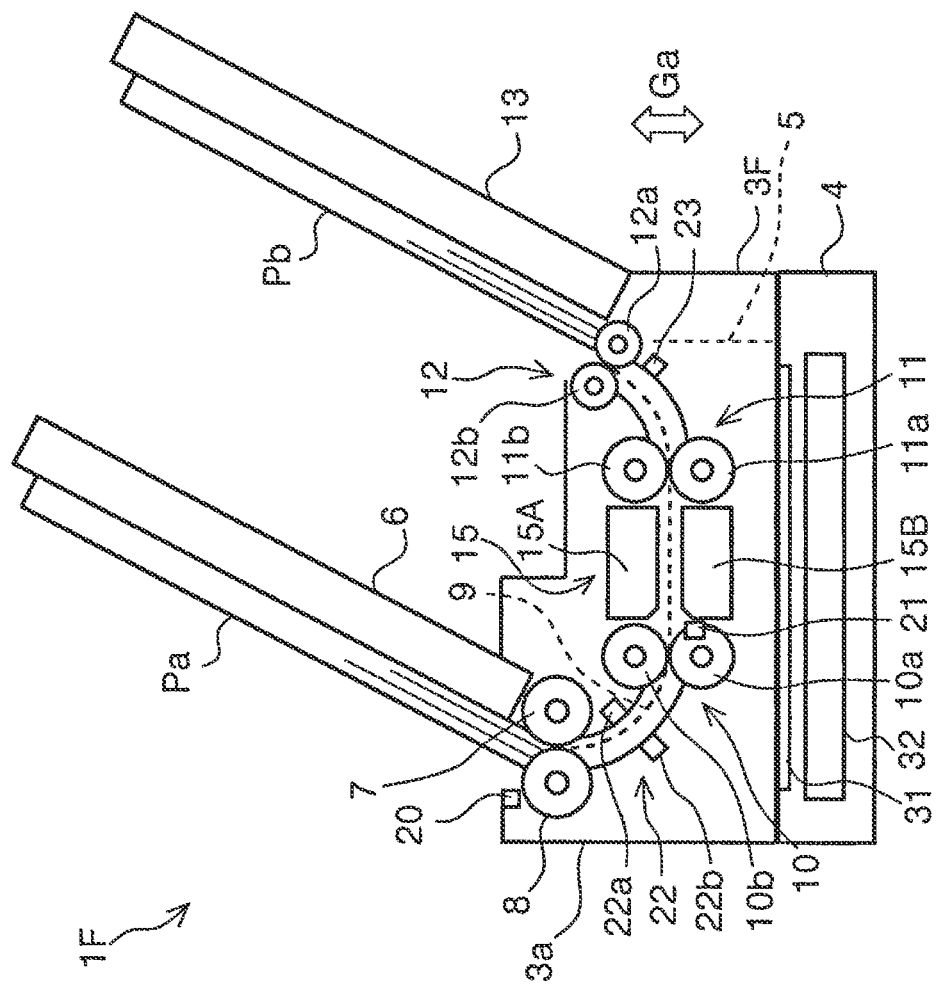
FIG. 9 is a side cross-sectional view schematically illustrating a scanner according to a fifth embodiment.
Figure 10:
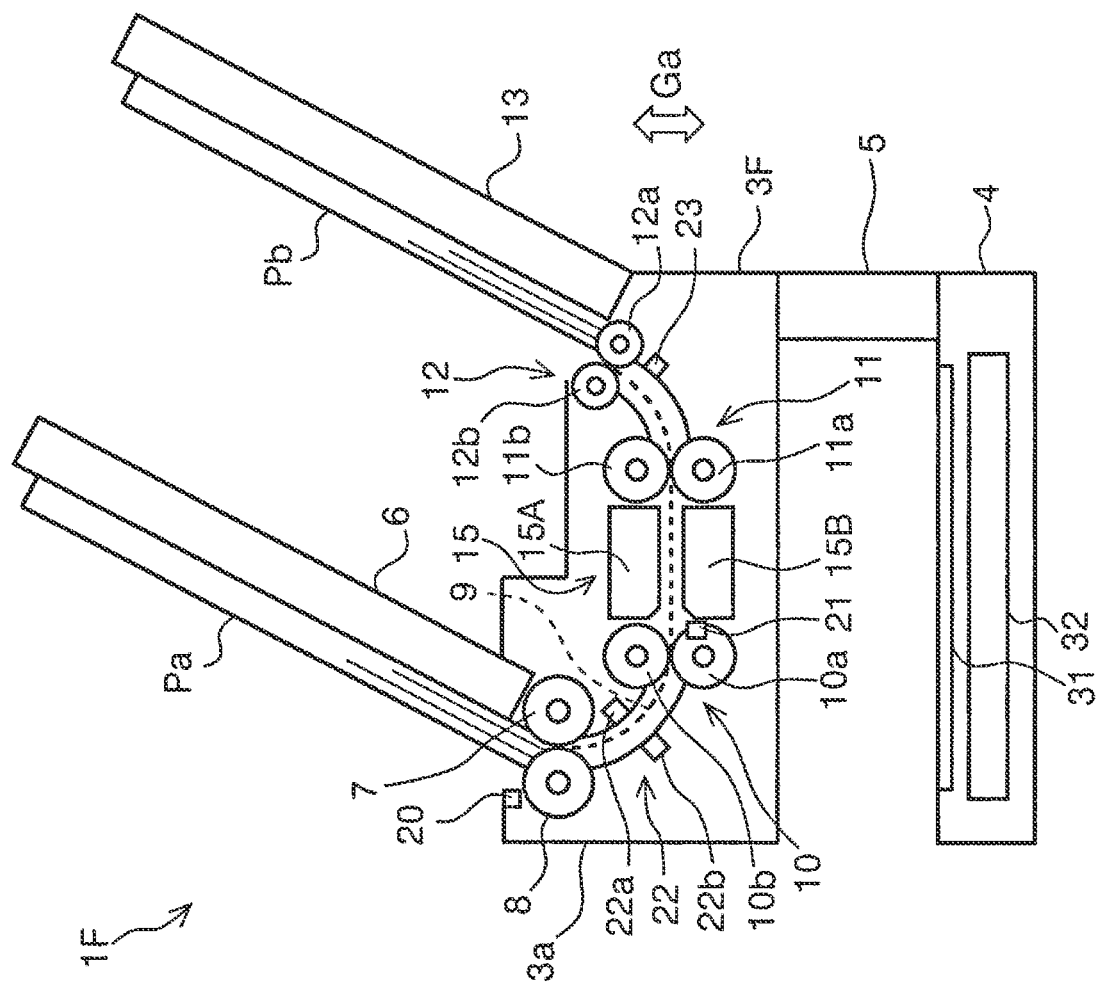
FIG. 10 is a side cross-sectional view schematically illustrating the scanner according to the fifth embodiment.

A scanner 1F illustrated in FIG. 9 and FIG. 10 includes an upper unit 3F and the lower unit 4. The position of the upper unit 3F can be changed with respect to the lower unit 4 in the vertical direction. FIG. 9 illustrates the upper unit 3F that is in the lowest position and FIG. 10 illustrates the upper unit 3F that is in the highest position. When the upper unit 3F is in the lowest position, the support section 5 is in the upper unit 3F. When the upper unit 3F is raised to the highest position with respect to the lower unit 4 as in FIG. 10, the upper unit 3F is supported by a support mechanism (not illustrated). With this structure, when the apparatus is not used as illustrated in FIG. 9, the distance between the upper unit 3F and the lower unit 4 may be shortened, saving the space occupied by the apparatus in the vertical direction.

It should be noted that the support section 5 may include a rack and the upper unit 3F may include a pinion to provide a rack-and-pinion mechanism. The pinion may receive attenuation when the pinion rotates. This structure regulates the speed in lowering the upper unit 3F, preventing the upper unit 3F from touching the lower unit 4.

Figure 11:
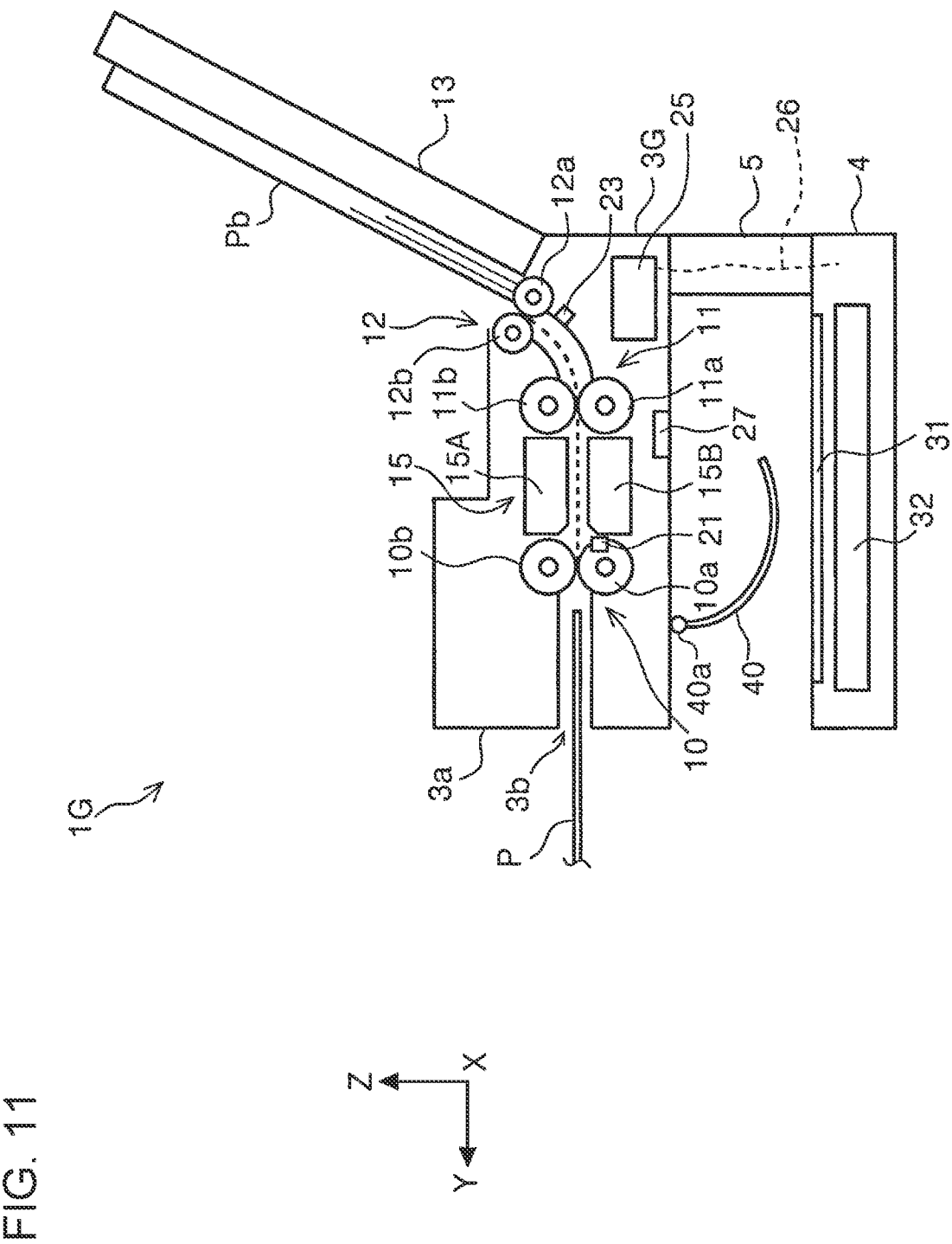
FIG. 11 is a side cross-sectional view schematically illustrating a scanner according to a sixth embodiment.

A scanner 1G illustrated in FIG. 11 includes an upper unit 3G and the lower unit 4. The feed tray 6, the feed roller 7, the separation roller 8, the set detector 20, and the multi-sheet feed detector 22 are omitted from the upper unit 3G. An opening 3b is provided in the side 3a that is the front of the apparatus for users to horizontally insert a document P through the opening 3b toward the first transport roller pair 10. This structure also provides the apparatus in which the overall size is reduced in the horizontal direction. It should be noted that the feed roller 7, the separation roller 8, the set detector 20, the multi-sheet feed detector 22, and/or other components may be disposed on the path from the opening 3b to the first transport roller pair 10.

It is to be understood that the present disclosure is not limited to the above-described embodiments, various modifications may be made within the scope of the following claims, and such modifications are also included within the scope of the present disclosure.

What is claimed is:

1. An image reading apparatus comprising:
    an upper unit; and
    a lower unit that is disposed vertically below the upper unit at a given spacing, wherein
    the upper unit includes
    a feed tray configured to support a document to be fed such that the document is inclined at an angle of 45° or more with respect to a horizontal;
    a feed section configured to feed the document supported by the feed tray in a direction having a vertically downward component;
    a transport path configured to transport the document fed by the feed section and reverse the document in a direction having a vertically upward component;
    a first reader disposed on the transport path, the first reader being configured to read the document;
    a discharge section disposed downstream of the first reader on the transport path, the discharge section being configured to discharge the document in a direction having a vertically upward component; and
    a discharge tray configured to support the document discharged by the discharge section such that the document is inclined at an angle of 45° or more with respect to the horizontal, and
    the lower unit includes
    a document positioning plate on which a document is mounted; and
    a second reader disposed vertically below the document positioning plate, the second reader being configured to read the document mounted on the document positioning plate, wherein
    a portion of the first reader and a portion of the document positioning plate overlap when viewed from vertically above.

2. The image reading apparatus according to claim 1, wherein the feed tray and the discharge tray are disposed at a given spacing in an apparatus depth direction, and
    the first reader is disposed within bounds of the document positioning plate in the apparatus depth direction.

3. The image reading apparatus according to claim 1, wherein at least one of the feed tray and the discharge tray is disposed within bounds of the upper unit when viewed from vertically above.

4. The image reading apparatus according to claim 1, wherein the document positioning plate is disposed within bounds of the first reader in a direction in which the first reader extends.

5. The image reading apparatus according to claim 1, further comprising:
    a support section disposed on a rear of the image reading apparatus in an apparatus depth direction such that the lower unit supports the upper unit, the support section defining an opening between the upper unit and the lower unit on a front of the image reading apparatus in the apparatus depth direction, wherein
    the second reader reads the document while the second reader is being moved in the apparatus depth direction, and a white reference section configured to be read by the second reader is disposed behind the document positioning plate in the apparatus depth direction.

6. The image reading apparatus according to claim 1, wherein the upper unit includes a first motor that is a drive source for applying a feeding force to a document, the first motor being disposed at one end in an apparatus width direction intersecting a document depth direction,
    the second reader reads the document while the second reader is being moved in the apparatus width direction, and
    the lower unit includes a second motor that is a drive source for moving the second reader in the apparatus width direction, the second motor being disposed at an end opposite to the one end at which the first motor is disposed in the apparatus width direction.

7. The image reading apparatus according to claim 1, wherein the lower unit includes a slide section configured to be slid with respect to a unit body in a horizontal direction, and the slide section includes the document positioning plate and the second reader.

8. The image reading apparatus according to claim 1, wherein the upper unit is configured to be moved with respect to the lower unit in the vertical direction.

9. The image reading apparatus according to claim 1, further comprising:
  a mount detector configured to detect whether a document is mounted on the document positioning plate, wherein
  a controller that controls the second reader detects a document mounted on the document positioning plate in accordance with a detection signal from the mount detector and reads the document mounted on the document positioning plate by using the second reader.

10. The image reading apparatus according to claim 1, further comprising:
  a controller configured to control the upper unit and the lower unit, wherein
  the controller is configured to simultaneously cause the upper unit to perform a document reading operation and the lower unit to perform a document reading operation.

11. The image reading apparatus according to claim 1, further comprising:
  a wireless communication section that reads, via wireless communication, information from an IC tag attached to the document mounted on the document positioning plate.

12. The image reading apparatus according to claim 1, further comprising:
  a document pressing section that presses the document mounted on the document positioning plate against the document positioning plate.

13. The image reading apparatus according to claim 1, wherein the first reader includes a lower sensor unit disposed below the transport path and an upper sensor unit disposed above the transport path,
  a portion of the upper sensor unit and a portion of the lower sensor unit overlap when viewed from vertically above, and
  a portion of the lower sensor unit and a portion of the document positioning plate overlap when viewed from vertically above.

14. The image reading apparatus according to claim 1, wherein the first reader includes a lower sensor unit disposed below the transport path and an upper sensor unit disposed above the transport path, and
  a portion of the upper sensor unit, a portion of the lower sensor unit, and a portion of the document positioning plate overlap when viewed from vertically above.

* * * * *